United States Patent

[11] 3,565,257

| [72] | Inventors | Cesare Cavalieri;<br>Sulzano, Brescia, P.le Comune Italy |
|---|---|---|
| [21] | Appl. No. | 870,409 |
| [22] | Filed | Dec. 5, 1969 |
| [45] | Patented | Feb. 23, 1971 |

[54] FLOATING BARRIER FOR WATER POLLUTANTS
3 Claims, 2 Drawing Figs.

[52] U.S. Cl. .................................................. 210/242,
161/175; 61/1
[51] Int. Cl. .................................................. E02b 15/04
[50] Field of Search ...................................... 57/140(BL),
144; 161/175; 210/170, 242(OWD);
61/1, 5, 1(F)

[56] References Cited
UNITED STATES PATENTS

| 2,228,529 | 1/1941 | Moeller ........................ | 210/OWD |
| 3,221,884 | 12/1965 | Muller ......................... | 210/OWD |
| 3,259,688 | 7/1966 | Towne et al. ................ | 161/175X |
| 3,507,741 | 4/1970 | Aleixo .......................... | 161/175 |
| 3,508,663 | 4/1970 | Brill ............................. | 210/OWD |

FOREIGN PATENTS

| 1,357,278 | 2/1964 | France ......................... | 161/175 |
| 1,214,493 | 4/1966 | Germany ..................... | 161/175 |

*Primary Examiner*—Reuben Friedman
*Assistant Examiner*—C. M. Ditlow
*Attorney*—Clario Ceccon ABSTRACT: The barrier for arresting, confining and absorbing water pollutants in suspension therein, such as tankers, discharged fluids, consists of a preferably cylindrical body containing a central propylene fiber rope surrounded in succession by a layer of polystyrene (blocks or granules, a layer of a mixture of propylene staples or waste and polystyrene granules, contained in a netting of propylene fiber, and a final layer of propylene staples or waste also contained in a netting. The barrier is floating so as to keep about one-half of its volume above the surface of the water.

PATENTED FEB 23 1971

3,565,257

3,565,257

FLOATING BARRIER FOR WATER POLLUTANTS

BACKGROUND OF THE INVENTION

1. Field of the Invention

The present invention relates to a floating barrier for arresting, confining and absorbing mineral oils, acids and other liquids suspended in water and having a specific gravity less than that of the water.

2. Description of the Prior Art

The serious damage caused by the pollution of bodies of water is very well known, particularly the damage caused by the continuous discharge into bodies of sea water from tankers of acidic substances, oily products and similar polluting fluids. These pollutants, floating on the surface of the water because of their lower specific gravity, progressively diffuse on the water to reach, ultimately, harbors, shorelines and beaches.

Therefore, numerous attempts have been made to arrest these polluting substances from damaging water basins, but no proposed solution has solved the threatening problem.

SUMMARY OF THE INVENTION

It is the main object of the present invention to provide a floating barrier for arresting, confining and absorbing the above-mentioned pollutants. This barrier is highly resistant to the corroding effect of such substances as sea water, mineral oils, acids, and the like.

It is another object of the invention to provide a floating barrier entirely constructed of synthetic plastic material, capable of floating on the water without additional supplementary floating or anchoring means.

A further object of the present invention is to provide a barrier of the type mentioned above, which is capable of resisting the impact of the waves without physical damage to its structure.

A still further object of the invention is to provide a barrier which is waterproof and has substantial ability to absorb polluting liquids suspended in the water, such as mineral oils, acidic fluids, and similar fluids having a specific gravity less than that of the water.

It is another object of the invention to provide a barrier which is considerably inexpensive because it is obtained from staples or waste from synthetic plastic materials, such as polypropylene fibers and polystyrene, which are otherwise unusable.

BRIEF DESCRIPTION OF THE DRAWINGS

The above objects and advantages of the invention will become more apparent from the following detailed description thereof and from the accompanying drawings, in which.

DESCRIPTION OF THE PREFERRED EMBODIMENT

Figure 1:
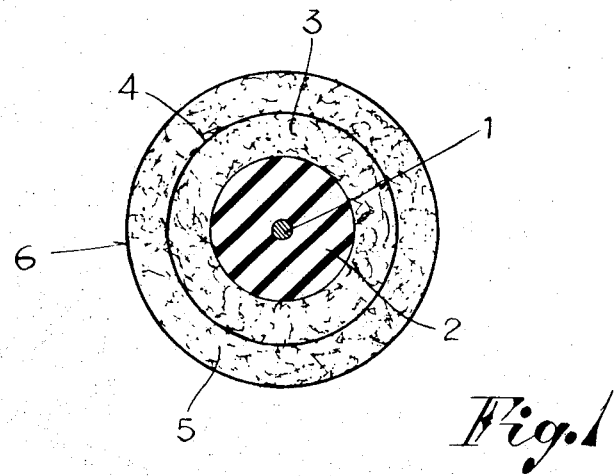
FIG. 1 is a cross-sectional view of the barrier of the invention.
Figure 2:
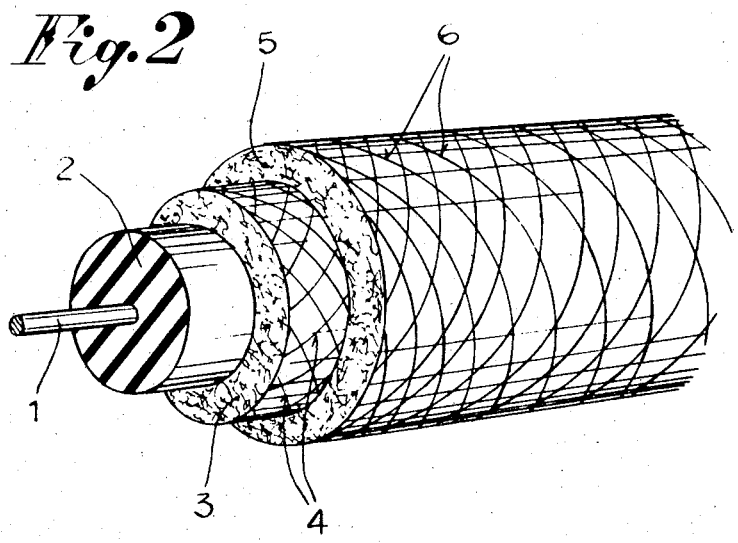
FIG. 2 is a perspective view of the barrier, showing the position in the barrier of the various components thereof.

Referring now to the accompanying drawings, the barrier, which may be shaped as illustrated, namely cross-sectionally circular, or in any other shape desired, consists of a central rope 1 of polypropylene fiber and of a suitable diameter, surrounded by a plurality of rings 2 of polystyrene. These rings may be monolithically built or may consist of granular particles suitably contained in such a manner as to retain a low specific gravity and, therefore, the ability to float. The rope 1 and the rings 2 are, in turn, completely enclosed in a layer of plastic material 3, composed of a mixture of staples or waste from fibers of polypropylene and granules of polystyrene, the whole mixture being contained in a net 4 of a polypropylene fiber.

A further peripheral enclosure 5 completes the barrier of the invention. Enclosure 5, of suitable thickness, consists of staples or waste from staples of polypropylene fibers and is contained by an outer netting 6 of polypropylene fiber.

The above-described barrier, which may be of any desired diameter and length, has an overall specific gravity such as to allow it to float in the water approximately to the level of the central rope 1. The relationship between immersed and nonimmersed portions of the barrier is a direct result of the ratio of polystyrene and polypropylene material employed.

The barrier may be located along the beaches as a protection against pollutants, or it may be located at a greater distance from the shoreline so as to define an area within which to discharge the polluting products from tankers. In any event, the barrier serves to confine the polluting agents and to prevent them from diffusing on the water surface, because of the barrier's high absorptive capacity and of the irreversible process of water-purification.

It is well understood that the dimensions of the barrier, the thickness of the floating layers of material, may vary depending on the requirements of the particular use.

I claim:

1. Floating barrier for arresting, confining and absorbing water pollutants in suspension therein comprising:
    a. a central rope of polypropylene fiber;
    b. a first layer of polystyrene surrounding said central rope;
    c. a second layer of a mixture of polypropylene granular polystyrene, said polypropylene being selected from the group consisting of staples and fiber waste, said mixture being contained within a netting of polypropylene fiber, said second layer surrounding said first layer;
    d. a third layer of polypropylene selected from the group consisting of staples and fiber waste and contained with a netting of polypropylene fiber, said third layer surrounding said second layer.

2. The barrier of claim 1, wherein said first layer is selected from the group consisting of monolythic blocks of polystyrene and granular polystyrene.

3. The barrier of claim 1, wherein the elements thereof are so assembled that some elements are pollutant-absorbers, while others are waterproof, the combination of said elements being such that said barrier is submerged only with about one half of its volume.